United States Patent
Kim et al.

(10) Patent No.: US 11,113,988 B2
(45) Date of Patent: Sep. 7, 2021

(54) APPARATUS FOR WRITING MOTION SCRIPT, APPARATUS FOR SELF-TEACHING OF MOTION AND METHOD FOR USING THE SAME

(71) Applicant: ELECTRONICS AND TELECOMMUNICATIONS RESEARCH INSTITUTE, Daejeon (KR)

(72) Inventors: Do-Hyung Kim, Daejeon (KR); Min-Su Jang, Daejeon (KR); Jae-Hong Kim, Daejeon (KR); Young-Woo Yoon, Daejeon (KR); Jae-Il Cho, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/918,659

(22) Filed: Jul. 1, 2020

(65) Prior Publication Data
US 2020/0335007 A1 Oct. 22, 2020

Related U.S. Application Data

(62) Division of application No. 15/450,337, filed on Mar. 6, 2017, now Pat. No. 10,748,444.

(30) Foreign Application Priority Data

Jun. 13, 2016 (KR) .......................... 10-2016-0073014
Oct. 26, 2016 (KR) .......................... 10-2016-0139932

(51) Int. Cl.
*G09B 19/00* (2006.01)
*G09B 5/00* (2006.01)
(Continued)

(52) U.S. Cl.
CPC ...... *G09B 19/0038* (2013.01); *A63B 24/0003* (2013.01); *G06K 9/00201* (2013.01);
(Continued)

(58) Field of Classification Search
CPC ..... G09B 19/003; G09B 5/02; G06K 9/00342
See application file for complete search history.

(56) References Cited

U.S. PATENT DOCUMENTS

| 4,828,500 A | 5/1989 | Seidel et al. |
| 5,857,855 A | 1/1999 | Katayama |

(Continued)

FOREIGN PATENT DOCUMENTS

| KR | 10-2005-0079893 | 8/2005 |
| KR | 10-2009-0105785 | 10/2009 |

(Continued)

*Primary Examiner* — Milap Shah
(74) *Attorney, Agent, or Firm* — Kile Park Reed & Houtteman PLLC

(57) ABSTRACT

Disclosed herein are an apparatus for writing a motion script and an apparatus and method for self-teaching of a motion. The method for self-teaching of a motion, in which the apparatus for writing a motion script and the apparatus for self-teaching of a motion are used, includes creating, by the apparatus for writing a motion script, a motion script based on expert motion of a first user; analyzing, by the apparatus for self-teaching of a motion, a motion of a second user, who learns the expert motion, based on the motion script; and outputting, by the apparatus for self-teaching of a motion, a result of analysis of the motion of the second user.

5 Claims, 14 Drawing Sheets

(51) Int. Cl.
  *G06K 9/00* (2006.01)
  *G06K 9/62* (2006.01)
  *G09B 5/02* (2006.01)
  *G06K 9/46* (2006.01)
  *A63B 24/00* (2006.01)

(52) U.S. Cl.
  CPC .......... *G06K 9/00342* (2013.01); *G06K 9/46* (2013.01); *G06K 9/6215* (2013.01); *G09B 5/02* (2013.01); *G09B 19/003* (2013.01); *G09B 19/0015* (2013.01); *A63B 2024/0012* (2013.01)

(56) References Cited

U.S. PATENT DOCUMENTS

| | | | |
|---|---|---|---|
| 5,904,484 | A | 5/1999 | Burns |
| 6,503,086 | B1 | 1/2003 | Golubov |
| 6,682,351 | B1 | 1/2004 | Abraham-Fuchs et al. |
| 7,264,554 | B2 | 9/2007 | Bentley |
| 7,283,647 | B2 | 10/2007 | McNitt |
| 9,350,951 | B1 | 5/2016 | Rowe |
| 10,748,444 | B2 * | 8/2020 | Kim ............... G06K 9/6215 |
| 2003/0232669 | A1 | 12/2003 | Smith et al. |
| 2008/0220941 | A1 * | 9/2008 | Shaw ................ A61B 5/16 482/9 |
| 2011/0006926 | A1 | 1/2011 | Kim et al. |
| 2012/0206577 | A1 | 8/2012 | Guckenberger et al. |
| 2014/0243710 | A1 | 8/2014 | Jeong |
| 2015/0078621 | A1 | 3/2015 | Choi et al. |
| 2016/0216770 | A1 | 7/2016 | Jang et al. |

FOREIGN PATENT DOCUMENTS

| | | |
|---|---|---|
| KR | 10-2010-0132322 | 12/2010 |
| KR | 10-2011-0065388 | 6/2011 |
| KR | 10-2014-0107062 | 9/2014 |

* cited by examiner

APPARATUS FOR WRITING MOTION SCRIPT, APPARATUS FOR SELF-TEACHING OF MOTION AND METHOD FOR USING THE SAME

CROSS REFERENCE TO RELATED APPLICATIONS

This application is a divisional application of U.S. patent application Ser. No. 15/450,337, filed Mar. 6, 2017, the disclosure of which is herein incorporated by reference in its entirety. This application claims the benefit of Korean Patent Application No. 10-2016-0073014, filed Jun. 13, 2016, and No. 10-2016-0139932, filed Oct. 26, 2016, which are hereby incorporated by reference in their entirety into this application.

BACKGROUND OF THE INVENTION

1. Technical Field

The present invention relates generally to a system framework for learning motion, and more particularly to a motion recognition-based service and a technique for learning motion by oneself.

2. Description of the Related Art

There is always a demand for learning movements in sports such as yoga, taekwondo, table tennis, and the like, or for learning appropriate postures required of professionals, such as flight attendants, hotel staff, and the like.

The best way to learn a specific movement is by repeatedly emulating the movement of an expert and continuously correcting postures by receiving immediate feedback thereon through a private lesson.

However, it is difficult for ordinary individuals to visit professional facilities and to be tutored by an expert, due to limitations such as location, time, expense, and the like. Accordingly, a self-teaching method for effectively learning a specific movement without the need to be tutored by an expert is in high demand, and business related thereto is being developed.

Currently, the most popular way to learn movements of yoga, gymnastics, dance, and the like by oneself is one in which learners watch a video and emulate movements in the video. That is, learners buy an instructional video or download a suitable clip from the Internet, and emulate the movement of an instructor shown in the video or the clip. However, the existing learning method, in which a learner merely emulates motions in a video, is not an effective self-teaching method because there is no feedback on the motion of the learner, such as the degree of accuracy of postures, information for correction and improvement, learning evaluation, and the like. Also, because learners only depend on their motivation for learning without provision of information about their progress, it is difficult for the learners to keep up learning.

In recent years, with the rapid development of IT technology, there are provided various content services based on motion recognition sensors and motion recognition technology.

Interactive game platforms capable of responding to the motion of users, such as Microsoft's Xbox, Sony's PlayStation, and the like, have been a hit worldwide. These types of game platforms are implemented using techniques in which the positions of body parts of a user and a designated posture and motion are recognized by analyzing depth images input through an inexpensive 3D camera.

In the wake of the success of interactive game content based on a simple form of motion recognition technology, motion recognition technology is also applied to sport fields in which a more complex motion is required, for example, golf, baseball, and the like, in order to coach good body postures. Recently, with technology for providing feedback to learners through the analysis of a motion, a sports simulator platform that includes hardware on which a learner can ride is being developed. In the case of sports in which it is difficult to be tutored by an expert instructor, such as horseback riding, yachting, and the like, a sports simulator platform that simulates an actual environment can become a good alternative.

Here, the interactive game platform, the system for analyzing a movement and posture in sport, the sports simulator platform including hardware, and the like provide services based on technology for analyzing the motion of a user, but they are not systems aimed at supporting self-teaching of individual learners.

The motion-based game platform is developed with the goal of entertainment or fitness, but does not provide a service for examining the posture of a user.

The sports posture analysis system provides detailed analysis of the posture of a player and diagnosis services based on the analysis. However, these services are developed by sports simulator providers so as to be specialized for a specific sport, and are provided in places for sports business equipped with related facilities, such as a screen golf simulator, a screen baseball simulator, and the like. Such a coaching system is not intended for self-teaching but aims at establishing expertise in sports simulators, increasing players' interest and immersion, and playing a role as an additional analysis tool for an expert instructor.

Considering that the above-described requirement for self-teaching is "provision of a universal method for learning exemplary motion in various fields without limitation as to time or place", existing coaching systems do not meet this requirement.

Meanwhile, Korean Patent Application Publication No. 10-2010-0132322, titled "method and system for motion learning using motion-capture and 3D graphics" discloses a motion learning system in which one or more 3D graphics motion images, simultaneously rendered using virtual characters to which a motion capture technique and 3D graphics technology are applied, and one or more 3D graphics step images are output at the same time via one or more display devices, whereby information about a person's motion in 3D space is accurately watched and understood through images taken from various points of view.

SUMMARY OF THE INVENTION

An object of the present invention is to provide a universal method for learning exemplary motions in various fields without limitation as to time and place in order to enable learners to learn motions and postures by themselves.

Another object of the present invention is to provide a generalized system framework in which an expert in a specific field may write, edit, and publish a motion script based on his or her performance, and in which multiple motion learners may learn correct motions by themselves using the published motion script.

A further object of the present invention is to enable a motion-based content producer to easily obtain motion data from a high-capacity motion script database, and to thereby support the production of instructional content and a motion-based service in which the expense for producing content is significantly reduced.

Yet another object of the present invention is to improve satisfaction with content in order to increase demand for self-teaching of motion by enabling learners to be provided with various motion-based content and services, developed by content producers, from a motion script store server.

Still another object of the present invention is to overcome the limitations of an existing self-teaching method, in which learners merely follow an instructional video, and to contribute to the construction of an ecosystem of content service related to self-teaching of motion.

In order to accomplish the above objects, an apparatus for writing a motion script according to an embodiment of the present invention includes an authoring unit for creating property information corresponding to a motion of a user; a sensor unit for acquiring sensing data from the motion of the user; a motion script creation unit for creating a motion script based on the property information and the sensing data; and an editing and publication unit for distributing the motion script.

Here, the authoring unit may include a header information configuration unit for creating motion script header information including at least one of a file property for the motion script and tag information to be used to search for the motion script; a motion property-mapping unit for mapping the motion of the user to the property information; and an additional information configuration unit for determining whether to provide additional information used for motion learning.

Here, the property information may include at least one of key pose setting information corresponding to a key pose of the user; key motion setting information corresponding to a key motion of the user; motion setting information corresponding to a speed and an intensity of the key motion; and key body part setting information corresponding to a key body part of the user based on the key pose and the key motion.

Here, the motion script creation unit may include a motion descriptor creation unit for detecting a type and characteristics of a motion capture device and creating motion descriptor information from the acquired sensing data based on the detected type and characteristics of the motion capture device; and a motion property creation unit for creating motion property information from the acquired sensing data based on the property information.

Here, the motion script creation unit may create the motion script including at least one of the motion script header information, the motion property information, the motion descriptor information, and the additional information.

Here, the editing and publication unit may distribute a final motion script, acquired in such a way that the created motion script is edited by performing at least one of editing of images, correction of motion details, correction of property details, and editing of additional information, in a motion script store server.

Also, in order to accomplish the above objects, an apparatus for self-teaching of a motion according to an embodiment of the present invention includes a learning unit for outputting expert motion of a motion script and thereby teaching the expert motion to a user; a sensor unit for acquiring sensing data from a motion of the user using a motion capture device; a motion evaluation unit for creating final motion evaluation information, acquired by evaluating the motion of the user based on the motion script and the sensing data; and an output unit for outputting the final motion evaluation information and corrective information for correcting the motion of the user.

Here, the learning unit may include an expert motion script configuration unit for creating learning property information using properties that the user selects in the motion script in order to learn a motion; a learning environment configuration unit for creating learning environment information based on a learning environment configured by the user; and a learner motion script configuration unit for creating a learner motion script from the motion of the user.

Here, the motion evaluation unit may include a motion analysis unit for creating posture accuracy information and dynamic expressiveness information of the user based on the motion script and the sensing data; and a motion evaluation calculation unit for creating the final motion evaluation information based on the posture accuracy information and the dynamic expressiveness information.

Here, the motion analysis unit may analyze motion descriptor information and motion property information using sensing data acquired from a motion capture device, which is a same type of device as a motion capture device used for the motion script.

Here, the motion analysis unit may create the posture accuracy information including posture accuracy values acquired by analyzing similarity of motions of the user for each result of analysis performed on the motion descriptor information and the motion property information based on the motion script and the sensing data.

Here, the motion analysis unit may create the dynamic expressiveness information including dynamic expressiveness values acquired by analyzing similarity of at least one of speed of the motion of the user, intensity of the motion of the user, and matching of a motion for a certain period for each result of analysis performed on the motion descriptor information and the motion property information based on the motion script and the sensing data.

Here, the motion evaluation calculation unit may set a weight for each of the posture accuracy values and a weight for each of the dynamic expressiveness values based on at least one of a number, a type, and characteristics of the motion capture device.

Here, for each motion of the user, the motion evaluation calculation unit may set a component proportion to be applied when the posture accuracy values and the dynamic expressiveness values, the weights of which are set, are added.

Here, the motion evaluation calculation unit may create the final motion evaluation information including final motion evaluation values calculated by adding the posture accuracy values and the dynamic expressiveness values based on the component proportion set for each motion of the user.

Here, the motion evaluation calculation unit may set a component proportion of the dynamic expressiveness values high and set a component proportion of the posture accuracy values low, in proportion to a learning capability value of the user.

Here, the output unit may edit the learner motion script based on the final motion evaluation information and the corrective information, and may distribute the learner motion script in a motion script store server.

Here, the output unit may further output a score of each evaluation element and learning evaluation information acquired by evaluating posture accuracy in each body part of the user, based on the final motion evaluation information.

Here, the output unit may further output in-depth evaluation information including variation of a score of each evaluation element in the expert motion learned by the user.

Also, in order to accomplish the above objects, a method for self-teaching of a motion, in which an apparatus for writing a motion script and an apparatus for self-teaching of a motion are used, according to an embodiment of the present invention includes creating, by the apparatus for writing a motion script, a motion script based on expert motion of a first user; analyzing, by the apparatus for self-teaching of a motion, a motion of a second user, who learns the expert motion, based on the motion script; and outputting, by the apparatus for self-teaching of a motion, a result of analysis of the motion of the second user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
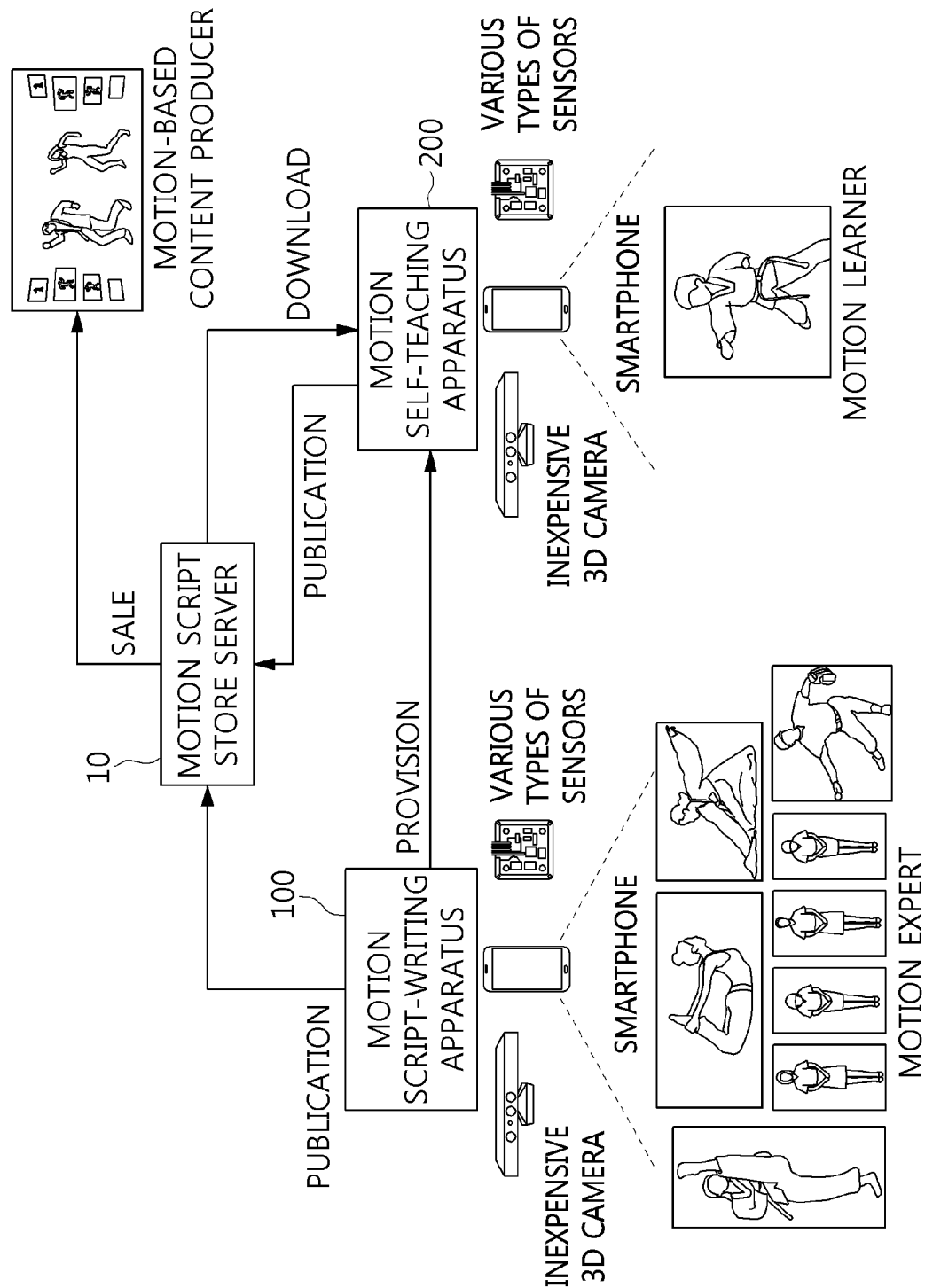
FIG. 1 is a view that shows a system for self-teaching of a motion according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

Hereinafter, a preferred embodiment according to the present invention will be described in detail with reference to the accompanying drawings.

FIG. 1 is a view that shows a system for self-teaching of a motion according to an embodiment of the present invention.

Referring to FIG. 1, in a system for self-teaching of a motion according to an embodiment of the present invention, a motion script-writing apparatus 100 may create a motion script based on the motion of an expert.

The motion script-writing apparatus 100 may capture the performance of an expert using a 3D camera, a smartphone, or a motion capture device that is capable of measuring a position, a speed, and an angle.

Here, the motion script-writing apparatus 100 may create a motion script, which is a motion instructional book, by receiving images and sensing data from the motion capture device, by describing the motion of an expert, and by assigning motion properties.

Here, the motion script-writing apparatus 100 may upload the motion script to a motion script store server 10.

A motion learner may receive a motion script that the motion learner wants to follow directly from a specific motion expert, or may download the motion script from the motion script store server 10, which sells motion scripts, and may learn exemplary motions using a motion self-teaching apparatus 200.

The motion self-teaching apparatus 200 compares an exemplary motion in a motion script written by an expert with the current motion of a learner, provides an assessment and a learning method, and helps the learner continuously correct his or her posture by oneself.

Also, the motion learner may produce a motion script based on his or her motion made during the process of learning the motion, and may publish the produced motion script on a store site.

Here, the motion script produced by the motion learner may be considered inferior to an exemplary motion of an expert, but may be helpful to another learner at a lower level. Also, such a motion script may expand the range of choice when content producers select desired motions.

Also, various motion scripts published by many unspecified experts (or learners) may accumulate in the motion script store server 10. The set of motion scripts in which motions performed by multiple people in various fields are described may become good data when human motion-based content is produced.

In an existing method, content producers have to autonomously produce human motion data or to entrust a producer who specializes in motion data with the production thereof.

That is, because motion data are produced for one-time use when necessary, it is disadvantageous in that the production of motion data is expensive and time-consuming. However, in the case of the system framework proposed in the present invention, content producers may easily obtain motion data from the store site of the motion script store server 10.

Figure 2:
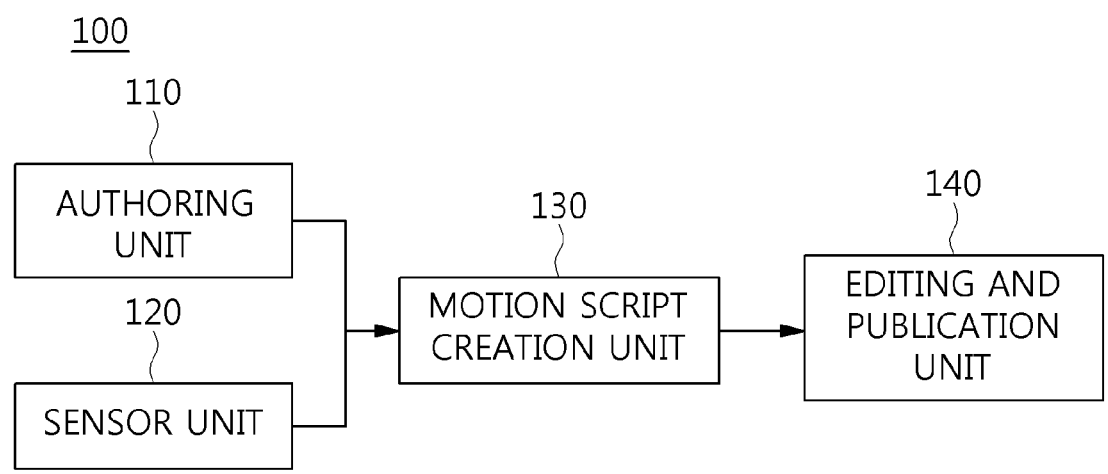
FIG. 2 is a block diagram that shows an apparatus for writing a motion script according to an embodiment of the present invention.
Figure 3:
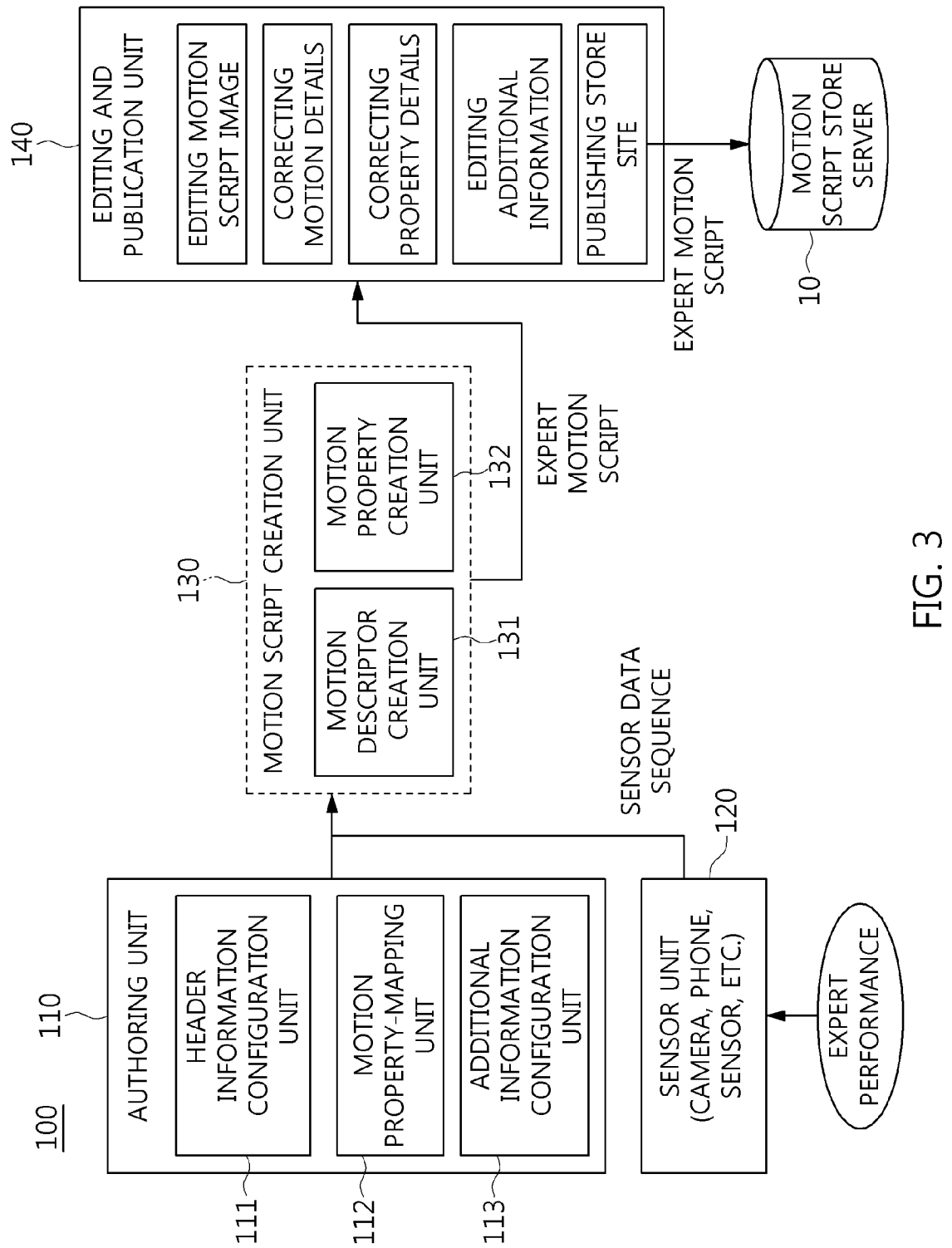
FIG. 3 is a view that specifically shows an example of the apparatus for writing a motion script illustrated in FIG. 2.

FIG. 2 is a block diagram that shows an apparatus for writing a motion script according to an embodiment of the present invention. FIG. 3 is a view that specifically shows an example of the apparatus for writing a motion script, illustrated in FIG. 2.

Referring to FIGS. 2 and 3, a motion script-writing apparatus 100 according to an embodiment of the present invention includes an authoring unit 110, a sensor unit 120, a motion script creation unit 130, and an editing and publication unit 140.

The authoring unit 110 may create property information about a motion script corresponding to the motion of a user.

That is, the authoring unit 110 may be an authoring user interface (UI) through which the overall properties of a motion script that an expert desires to produce may be created and configured.

Here, the authoring unit 110 may include a header information configuration unit 111, a motion property-mapping unit 112, and an additional information configuration unit 113.

Here, the header information configuration unit 111 may create motion script header information that includes at least one of a file property for the motion script and tag information to be used to search for the motion script.

That is, the header information configuration unit 111 may describe the property of a motion script file, such as an author, the time at which the motion script file was written, the type of sensor, a description of the motion, the category in which the motion is included, and the like.

The motion property-mapping unit 112 may assign property information to the motion of an expert.

That is, the motion property-mapping unit 112 may assign information about the properties of the motion itself.

Here, the motion property-mapping unit 112 may explicitly specify information about points to be focused on when a learner learns a specific motion, for example, a key pose, a key motion, the importance of a key body part, and the like, before an expert captures the motion.

The property information may include at least one of key pose setting information corresponding to key poses, which are important poses in the motion of an expert, key motion setting information corresponding to a key motion, which is the important motion in the motion of an expert, motion setting information about the speed and intensity of the key motion, and body part importance setting information about key body parts of a user in order to set the importance of each body part of an expert when each key pose or key motion is performed.

The additional information configuration unit 113 may determine whether to provide additional information for helping a learner learn a motion.

That is, the additional information configuration unit 113 may determine whether to provide additional information for helping learning, for example, an audio sequence such as background music, a voice description of an expert, and the like.

The sensor unit 120 may obtain expert motion-sensing data from the motion of an expert using a motion capture device for authoring.

The motion capture device for authoring may include at least one of a camera, a smartphone, a motion sensor, a position sensor, an acceleration sensor, an inertia sensor, a multi-sensor, and a Kinect device, through which the expert motion-sensing data can be acquired.

The motion script creation unit 130 may create a motion script based on the configured property information and the acquired sensing data.

That is, the motion script creation unit 130 may create a motion script from a sensing data sequence for the expert performance, acquired using the motion capture device for authoring (an inexpensive 3D camera, a smartphone, variable sensors, or the like), and from the header and property information of the motion script, which is set and assigned in the authoring unit 110.

The motion script creation unit 130 may include a motion descriptor creation unit 131 and a motion property creation unit 132.

The motion descriptor creation unit 131 may detect the type and characteristics of a motion capture device, and may create motion descriptor information from the acquired expert motion-sensing data based on the detected type and characteristics of the motion capture device.

That is, the motion descriptor creation unit 131 may describe exemplary motions by receiving expert motion-sensing data, acquired by capturing the performance of an expert.

Here, the motion descriptor creation unit 131 detects the type and characteristics of the motion capture device for authoring, which is connected with the current system, and may acquire expert motion-sensing data extractable from the device.

For example, when a 3D camera, such as a Kinect, is connected with the current system, a depth image sequence, a 2D image sequence, or an audio sequence may be input, and expert motion-sensing data corresponding thereto may be stored as a component of a motion descriptor.

Also, the motion descriptor creation unit 131 may create an additional component of the motion descriptor by extracting the position of a body part from the depth image sequence.

The motion property creation unit 132 may create motion property information from the acquired expert motion-sensing data based on property information.

That is, the motion property creation unit 132 may automatically extract properties from the motion of an expert at the time of storing the motion properties assigned by the expert in the authoring unit 110.

While the motion properties that can be created through the above-mentioned authoring UI are knowledge-based properties acquired based on the experience of an expert, the properties created by the motion property creation unit 132 may be properties based on statistical analysis of the motion.

For example, the motion property creation unit 132 may extract the displacement, the speed, the acceleration, the angular speed, and the like of the motion in the whole body, the upper body, the lower body, both arms, and both legs.

Here, the motion property creation unit 132 may create motion property information, such as the size, the speed, the complexity, the intensity, and the flexibility of the full motion or a motion unit of the corresponding motion based on the extracted quantified information.

The motion property information is characteristics related to the dynamic quality of a continuous motion, which differs from a static posture such as a pose, and may become a criterion for the provision of corrective information for a method for expressing motions with high precision when self-teaching is performed.

Here, the motion script creation unit 130 may create a motion script that includes at least one of the motion script header information, the motion property information, the motion descriptor information, and the additional information.

The editing and publication unit 140 may distribute the created motion script in the motion script store server 10.

That is, the editing and publication unit 140 may be configured as a user interface through which the created motion script can be edited and through which the edited motion script can be uploaded to the motion script store server 10.

Here, the editing and publication unit 140 may include a UI for editing images of a motion script, a UI for correcting motions and properties in detail, a UI for editing additional information, and a UI for publishing a store site.

Here, the editing and publication unit 140 may distribute the final motion script, acquired in such a way that the created motion script is edited by performing at least one of editing images, correcting motion details, correcting property details, and editing additional information, in the motion script store server.

Figure 4:
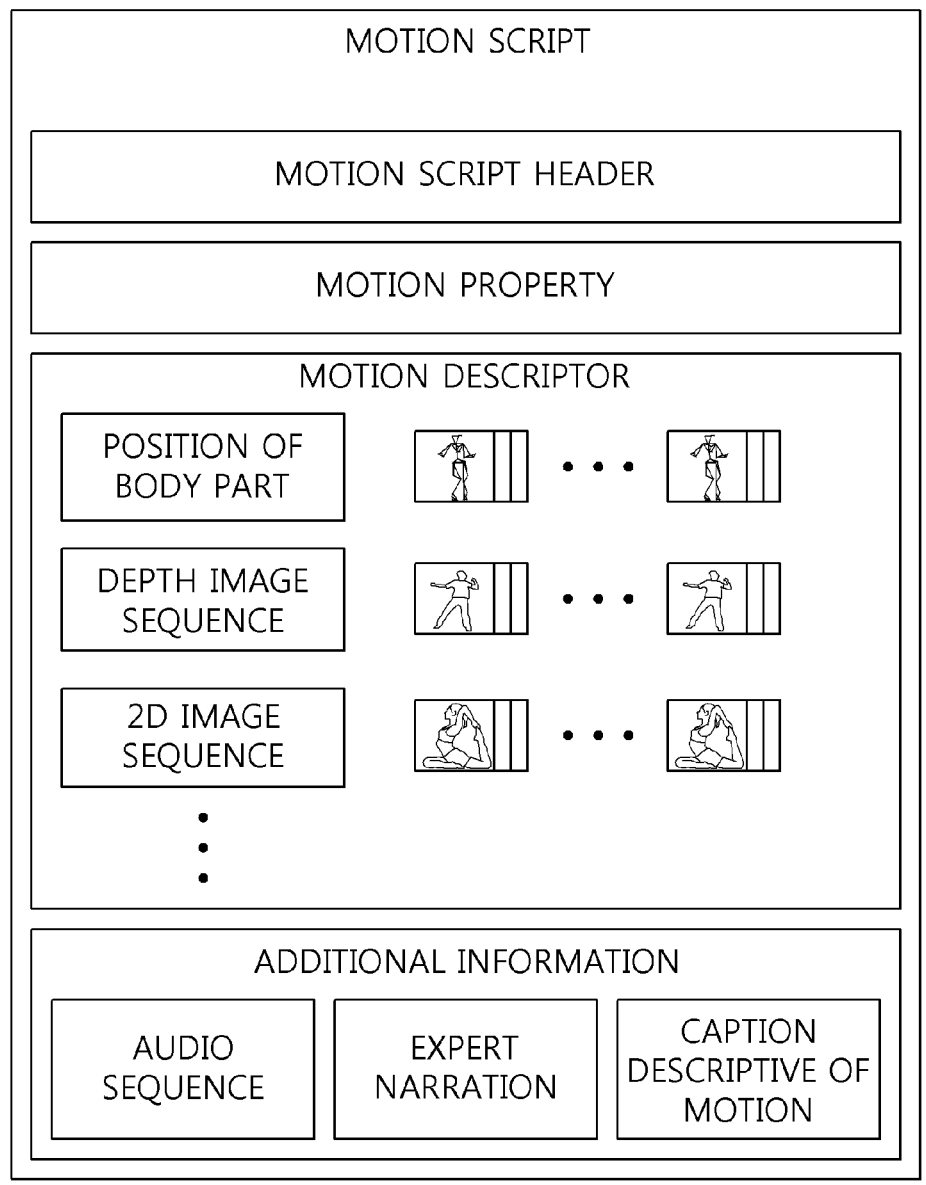
FIG. 4 is a view that shows a motion script according to an embodiment of the present invention.

FIG. 4 is a view that shows a motion script according to an embodiment of the present invention.

Referring to FIG. 4, a motion script according to an embodiment of the present invention includes a motion script header, a motion property, a motion descriptor, and additional information.

The motion script header may include the overall motion script header information of a motion script file.

The motion script header information may include information such as an author, the time at which the motion script was written, the type of sensor used for authoring, a simple description of the motion, a keyword for the motion, the category in which the motion is included, the length of the motion, and the like.

Here, the motion script header information may be used as tag information to be used to effectively search for a motion script desired by a learner.

The motion property may include motion property information about the properties of the motion itself, rather than the properties of a motion script file.

Here, information about points to be focused on when a learner learns a specific motion is assigned as the motion properties.

For example, the motion properties may include information, such as a key pose for representing the most important posture in a motion, a key motion for representing the most important motion, the importance of each body part when making a specific pose, the speed and intensity of the key motion, and the like. These motion properties may be explicitly specified by an expert in the motion script-writing apparatus 100, which has been explained with reference to FIGS. 2 and 3, or may be automatically created by the motion script-writing apparatus 100.

The motion descriptor is a component for storing motion descriptor information corresponding to an image sequence and sensing data extracted from a motion performed by an expert. The motion descriptor information may correspond to an exemplary motion when a learner who downloads the motion script learns the motion.

That is, the motion descriptor information may correspond to a criterion for providing feedback on the motion of a learner and information for correcting the motion through a motion self-teaching apparatus 200.

For example, components of motion descriptor information may vary depending on the type of sensor that was used when an expert created the motion script, and on information that can be provided by the sensor.

When a motion script is written using a smartphone, a 2D image sequence or information about the speed and acceleration of a hand movement may be stored. When a motion script is written using an inexpensive 3D camera, such as a Kinect, it is possible to acquire more specific and various information than when using a smartphone, and the more specific information may include frame data comprising information about the position of each joint, a 3D depth image sequence, a 2D image sequence, and the like.

If an expert wants to provide more detailed and specific motion information, the expert may use a position sensor, an acceleration sensor, an Inertial Measurement Unit (IMU) sensor, or the like by placing it on a desired body part.

Here, motion descriptor information may be created from the acquired expert motion-sensing data. In other words, an expert may describe a motion using a motion capture device in which various sensors capable of sensing a motion are coupled, and the quality of a motion script may be improved with a greater variety of types of data that configure the motion descriptor information.

The additional information is information for helping learners effectively teach themselves a motion. An author may additionally provide an audio sequence, such as background music for helping learners concentrate on learning, a voice description of an expert for specifically instructing a motion, a caption for explaining motions, which can be displayed with a 2D video, and the like.

Figure 5:
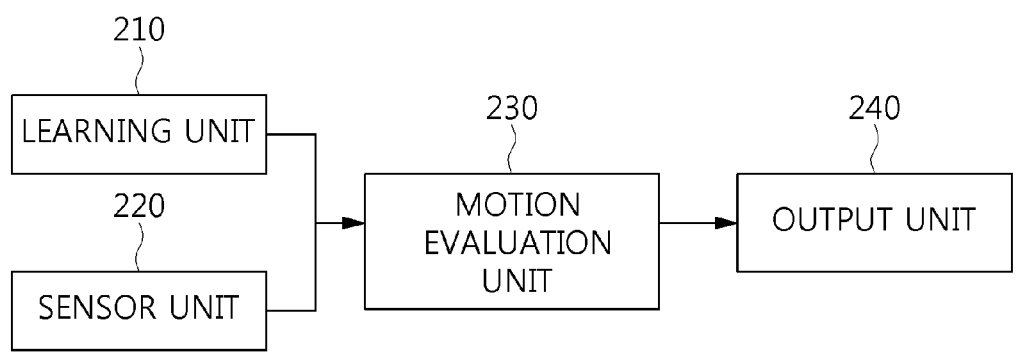
FIG. 5 is a view that shows an apparatus for self-teaching of a motion according to an embodiment of the present invention.
Figure 6:
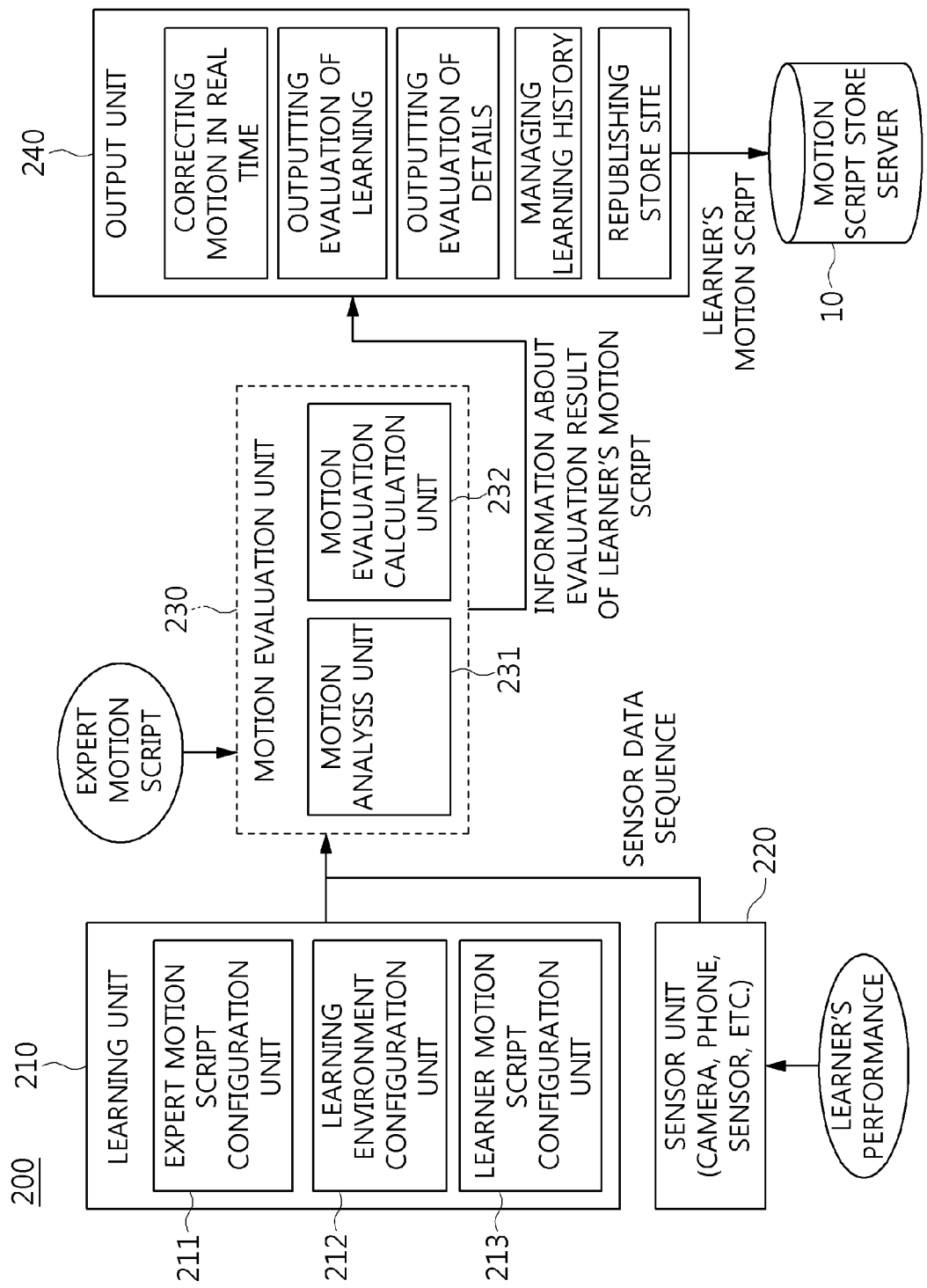
FIG. 6 is a view that specifically shows an example of the apparatus for self-teaching of a motion, illustrated in FIG. 5.

FIG. 5 is a view that shows an apparatus for self-teaching of a motion according to an embodiment of the present invention. FIG. 6 is a view that specifically shows an example of the apparatus for self-teaching of a motion, illustrated in FIG. 5.

Referring to FIGS. 5 and 6, a motion self-teaching apparatus 200 according to an embodiment of the present invention includes a learning unit 210, a sensor unit 220, a motion evaluation unit 230, and an output unit 240.

The learning unit 210 may teach expert motion to a user by outputting the expert motion of a motion script.

Here, the learning unit 210 may directly receive the motion script acquired by a learner, or may download the motion script from a motion script store server 10.

Here, the learning unit 210 may output the expert motion of a motion script using a display device or by connecting a display device with the motion self-teaching apparatus 200.

Here, the learner may learn the expert motion by emulating the expert motion output via the display device.

Here, the learning unit 210 enables a learner to select a motion script depending on the motion that the learner wants to learn, before learning is performed.

Here, the learning unit 210 may include an expert motion script configuration unit 211, a learning environment configuration unit 212, and a learner motion script configuration unit 213.

The expert motion script configuration unit 211 may configure learning property information by selecting properties necessary for the motion that the learner wants to learn from the motion property information included in the motion script.

The learning environment configuration unit 212 may configure learning environment information for the motion that the learner wants to learn.

The learner motion script configuration unit 213 may configure the header and properties of a learner's motion script in order to create the learner's motion script from the motion of the learner.

The sensor unit 220 may acquire learner's motion-sensing data from the motion of the learner using a motion capture device for learning.

The motion capture device for learning may include at least one of a camera, a smartphone, a motion sensor, a position sensor, an acceleration sensor, an inertia sensor, a multi-sensor, and a Kinect device, through which the learner's motion-sensing data may be acquired from the motion of the learner.

The motion evaluation unit 230 may create the final motion evaluation information by evaluating the acquired learner's motion-sensing data based on the motion script.

That is, the motion evaluation unit 230 may provide evaluation information to a user by comparing the performance of a learner, acquired using the motion capture device for learning (an inexpensive 3D camera, a smartphone, or various sensors) with the motion described in the motion script of an expert and by analyzing the result of the comparison.

Here, the motion evaluation unit 230 may compare the motion descriptor and motion properties of an expert in the motion script with the motion descriptor and the motion properties acquired from a motion sequence of the current learner, analyze the result of the comparison, and provide the result of the evaluation. When the comparison of motions is performed, the motion descriptors and properties extracted from sensing data acquired from the same device are compared, whereby a result may be calculated. Sensing data acquired from different devices may be compared with each other, but the evaluation result may have low reliability because a motion descriptor and motion properties from one device differ from those from another device.

Here, the motion evaluation unit 230 may include a motion analysis unit 231 and a motion evaluation calculation unit 232.

The motion analysis unit 231 may create posture accuracy information and dynamic expressiveness information of the learner, acquired based on the motion script and the sensing data.

That is, the motion analysis unit 231 may compare the expert motion in the motion script with the motion of a learner who is performing the current motion and analyze the result of the comparison.

Here, the motion analysis unit 231 may calculates a value related to the accuracy of a posture through the comparison of motion descriptors, and may calculate the result of analysis of dynamic expressiveness through the comparison of motion properties.

The motion analysis unit 231 may perform a comparison and analysis of motion descriptor information and motion property information, which are created from learner's motion-sensing data acquired using the motion capture device for learning, which is the same type of device as the motion capture device that was used to create the motion script.

Here, the motion analysis unit 231 may create posture accuracy information including posture accuracy values, each of which is acquired by analyzing the similarity between the posture of the learner and the posture in the motion script when analysis is performed on the motion descriptor information and the motion property information of the motion script and the acquired learner's motion-sensing data.

Here, the motion evaluation calculation unit 232 may create the final motion evaluation information based on the posture accuracy information and the dynamic expressiveness information.

Here, the motion evaluation calculation unit 232 may set a weight for each of the posture accuracy values and each of the dynamic expressiveness values based on at least one of the number, the type and the characteristics of the motion capture devices for learning.

Here, for each motion of the learner, the motion evaluation calculation unit 232 may set component proportions of the posture accuracy values and the dynamic expressiveness values, to be applied when the posture accuracy values and the dynamic expressiveness values, the weights of which are set, are added.

Here, the motion evaluation calculation unit 232 may create the final motion evaluation information, which includes the final motion evaluation values, calculated by adding the posture accuracy values and the dynamic expressiveness values based on the component proportions set for each motion of the learner.

Here, the motion evaluation calculation unit 232 sets a component proportion of the dynamic expressiveness values high and sets a component proportion of the posture accuracy values low in proportion to the learning capability value of the learner.

For example, if the learning capability value of the learner is set low so as to correspond to a beginner, the motion evaluation calculation unit 232 may set a component proportion of the posture accuracy values high, but may set a component proportion of the dynamic expressiveness values low.

Also, if the learning capability value of the learner is set high so as to correspond to an expert, the motion evaluation calculation unit 232 may set a component proportion of the dynamic expressiveness values high, but may set a component proportion of the posture accuracy values low.

The output unit 240 may output the final motion evaluation information and motion-corrective information for correcting the motion of the learner.

That is, the output unit 240 may correct motions in real time by receiving the final motion evaluation information, and may provide the comprehensive evaluation result of the learner and the evaluation of details.

Here, the output unit 240 may help a learner continuously correct the motion based on the learning result through learning history management.

Here, the output unit 240 may further output a score of each evaluation element and learning evaluation information including the motion accuracy in each body part of the learner, based on the final motion evaluation information.

Here, the output unit 240 may further output in-depth evaluation information including variation of a score of each evaluation element of the expert motion learned by the user.

Also, the output unit 240 may include a UI through which a motion script of a learner may be published.

That is, the output unit 240 may edit the learner's motion script based on the final evaluation result information and the corrective information, and may distribute the learner's motion script in the motion script store server.

Figure 7:
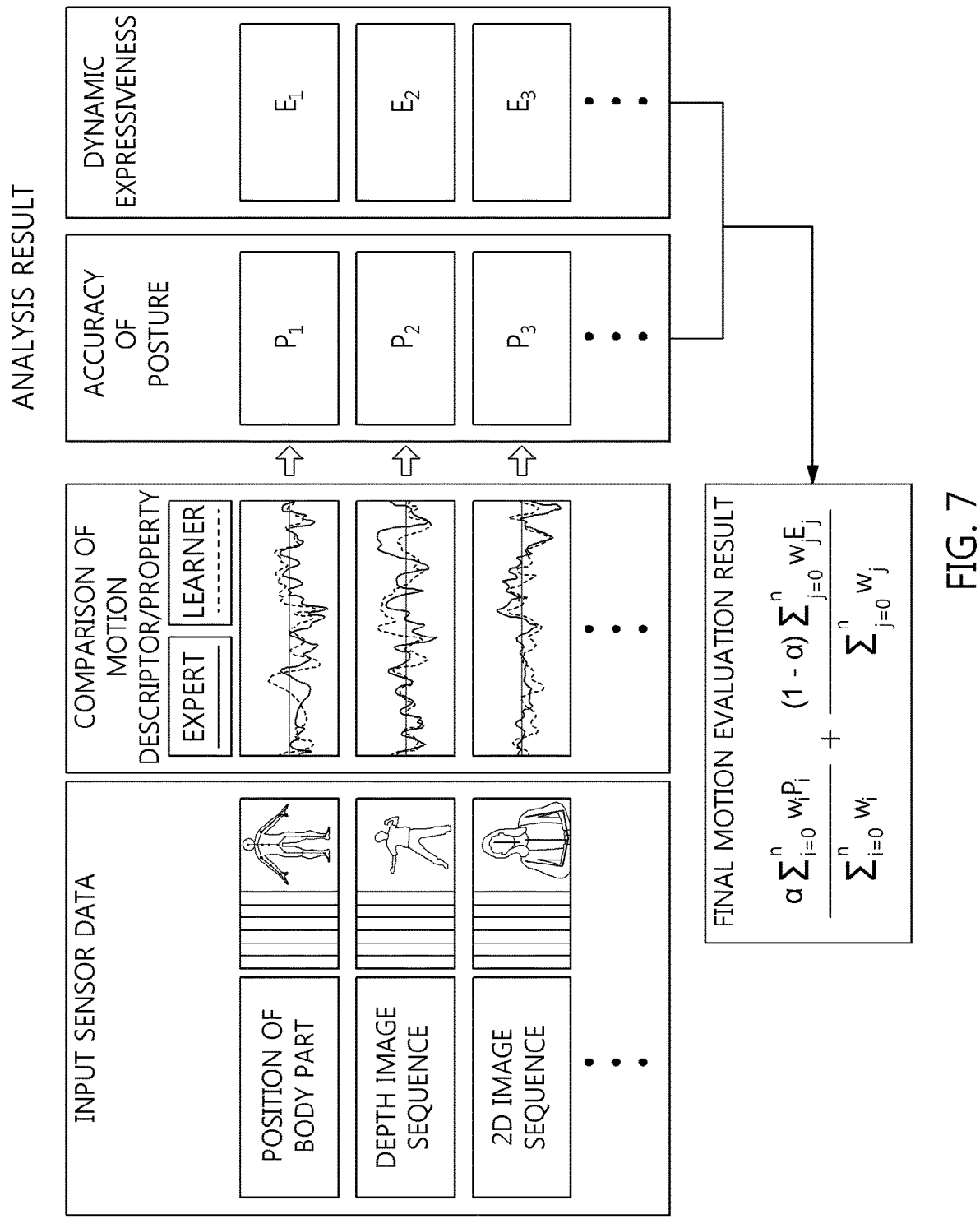
FIG. 7 is a view that specifically shows an example of the process of evaluating a motion, performed in the motion evaluation unit illustrated in FIG. 6.

FIG. 7 is a view that specifically shows an example of the process of evaluating a motion, performed by the motion evaluation unit illustrated in FIG. 6.

As described above, as a motion capture device for authoring, which is capable of capturing the motion of an expert, there are various devices, such as a camera and a smartphone, and various sensors. Motion experts may capture their performance by selecting a suitable motion capture device for authoring, and the expert motion-sensing data acquired by the motion capture device are stored in a motion script. Like the motion experts, motion learners may also select various types of motion capture devices for learning in order to learn motions. For example, if a motion script desired to be learned includes expert motion captured using a 3D camera and a smartphone, a learner may select any one of a 3D camera and a smartphone as a motion capture device in order to capture his or her motion, or may use both of them. That is, a learner may acquire his or her motion using some or all of the devices that are the same type as the motion capture device that was used for authoring when the motion script was written, and may teach oneself motions.

In the process of evaluating a motion, the motion descriptor and the motion properties of an expert in a motion script are compared with the motion descriptor and the motion properties acquired from a motion sequence of the current learner, the result of the comparison is analyzed, and the evaluation result may be provided. When comparison of motions is performed, motion descriptors and properties extracted from sensing data acquired from the same device are compared, and a result may be calculated. Sensing data acquired from different devices may be compared, but the evaluation result may have low reliability because a motion descriptor and motion properties from one device differ from those from another device.

The result of comparison and analysis of motion descriptors and motion properties may be categorized into posture accuracy and dynamic expressiveness.

Motion comprises a set of uninterrupted postures (poses), and posture accuracy may correspond to an analysis result concerning how similar the static posture of a learner is to the posture of an expert at a specific time (or in a specific period). On the other hand, dynamic expressiveness may correspond to an analysis result concerning the similarity of the quality of a continuous motion, such as the size, the speed, the intensity, the flexibility, and the like of the motion of a learner, with the expert motion. That is, dynamic expressiveness is an analysis result concerning the quality of a motion, and provides evaluation information about whether the way to express the motion is suitable.

The present invention may use various existing techniques through which the similarity between two postures or motions may be analyzed for each piece of sensing data.

For example, in order to analyze the similarity, the present invention may use a method in which the similarity between two postures or motions is analyzed using body part position data extracted from a 3D camera, a method in which the similarity of the whole body posture is calculated by measuring the displacement and angle of each joint, a method in which the similarity is measured by matching templates of body silhouettes and comparing shapes using a depth image or a 2D image, or the like.

That is, all existing methods for analyzing similarity may be applied to the present invention.

The final motion evaluation result may be calculated using the posture accuracy information and dynamic expressiveness information, acquired as a result of comparison and analysis of motion descriptors and motion properties for each type of the input sensing data.

Here, the final motion evaluation result may be calculated as the following Equation (1):

$$\frac{\alpha \sum_{i=0}^{n} w_i P_i}{\sum_{i=0}^{n} w_i} + \frac{(1-\alpha) \sum_{j=0}^{n} w_j E_j}{\sum_{j=0}^{n} w_j} \quad (1)$$

where n denotes the number of pieces of matched sensing data, i denotes the index (type) of matched sensing data, $P_i$ denotes an analysis result of posture accuracy acquired through the comparison of motion descriptors extracted from the i-th piece of sensing data, and $W_i$ denotes a weight for the analysis result of the accuracy.

Because a more reliable result may be calculated in the analysis of posture accuracy as the amount of sensing data, captured using a motion capture device, is increased and as the sensor data are more precise, a high weight may be assigned to the analysis result of posture accuracy. Also, $E_j$ denotes an analysis result of dynamic expressiveness acquired through the comparison of motion properties extracted from the j-th piece of sensing data, and $W_j$ denotes a weight for the analysis result of dynamic expressiveness. That is, $W_j$ is a weight for incorporating the difference of qualities in dynamic information provided depending on the characteristics of a motion capture device.

The final motion evaluation result concerning how similar the motion of a learner is to the expert motion described in a motion script may be represented as the sum of posture accuracy and dynamic expressiveness. In the final result, component proportions of the posture accuracy and the dynamic expressiveness may be adjusted using a. If the accuracy of a posture is more important than the expressiveness of the motion to be learned, the component proportion of the analysis result of posture accuracy may be increased in the final result value by setting the value of a higher. Conversely, in the case of artistic movement, in which expressiveness is more important, such as dancing, the component proportion of the dynamic expressiveness may be increased by setting the value of a lower. In another example, when the learner is a beginner, accuracy is more important than expressiveness, thus a is set high, but if a learner is at an expert level and the posture is perfect, the component proportion of the expressiveness may be set higher.

Figure 8:
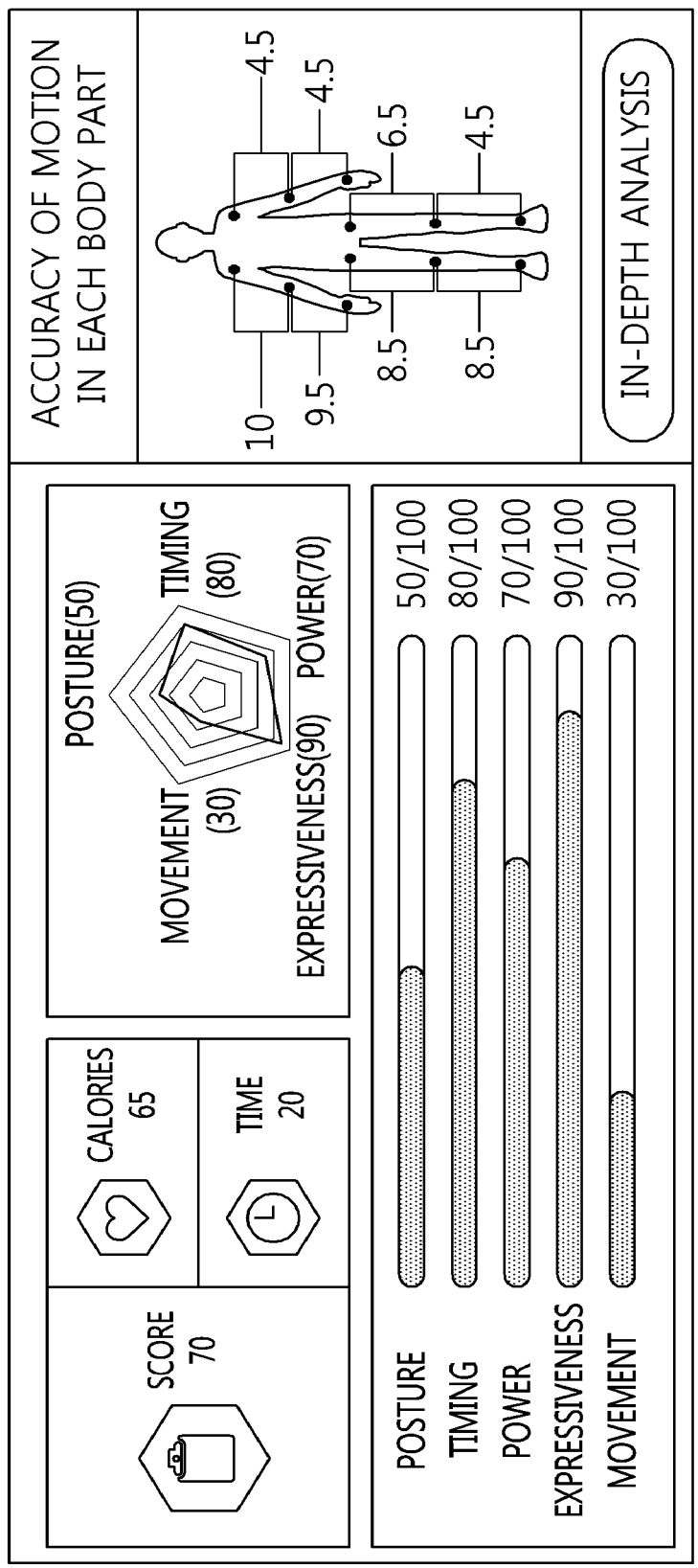
FIG. 8 and FIG. 9 are views that show a screen on which the final motion evaluation result is output according to an embodiment of the present invention.
Figure 9:
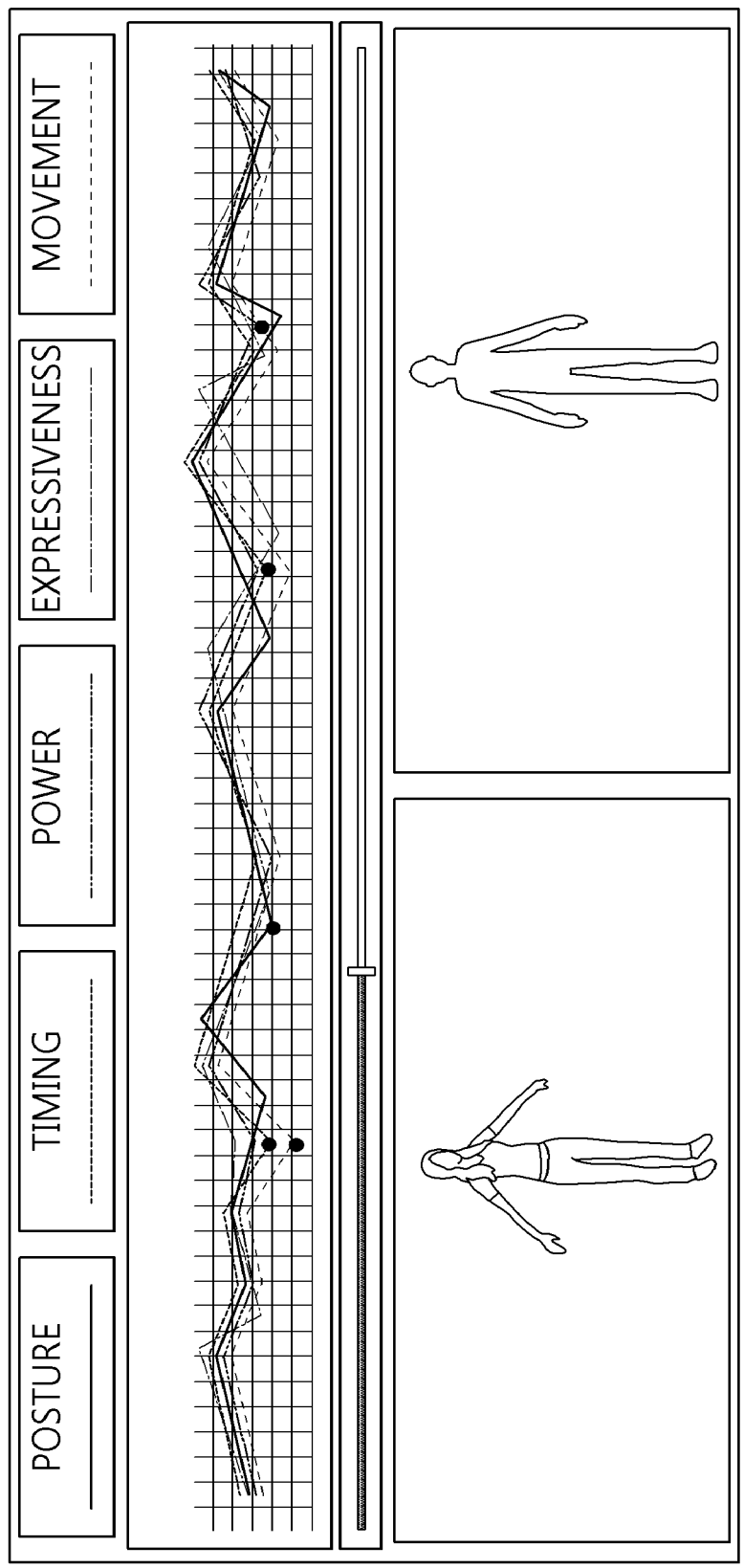

FIG. 8 and FIG. 9 are views that show a screen on which the final motion evaluation result is displayed according to an embodiment of the present invention.

Referring to FIG. 8, a screen on which the final motion evaluation result is displayed according to an embodiment of the present invention shows that scores are given to respective properties, such as posture, timing, intensity, expressiveness, and movement. Here, calories and time expended during the learning may be displayed along with the total of the property scores.

The scores for respective properties may be displayed in the form of various charts, including a bar chart, a radar chart and the like.

Also, motion accuracy of each body part may be displayed, whereby corrective information may be provided to a learner.

Referring to FIG. 9, a score for each motion property, which is changed while motion learning is performed, may be represented in the form of a line chart. Also, an exemplary motion of an expert and the motion performed by a learner may be displayed by outputting the captured image data.

Figure 10:
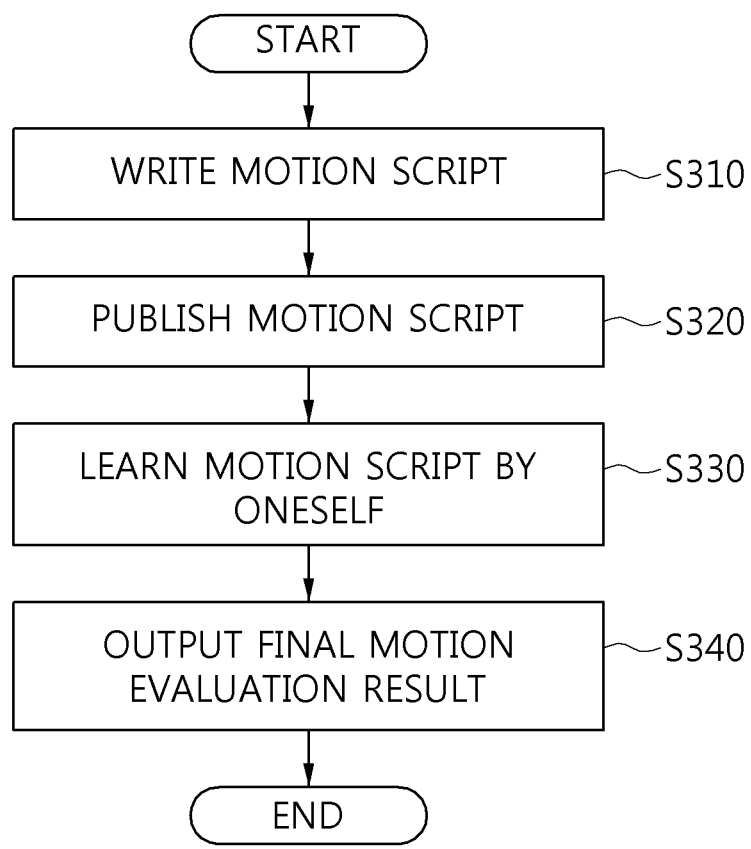
FIG. 10 is a flowchart that shows a method for self-teaching of a motion according to an embodiment of the present invention.

FIG. 10 is a flowchart that shows a method for self-teaching of a motion according to an embodiment of the present invention.

Referring to FIG. 10, in the method for self-teaching of a motion according to an embodiment of the present invention, first, a motion script is written at step S310.

That is, at step S310, a motion script-writing apparatus 100 may create a motion script based on expert motion.

Here at step S310, property information of the motion script may be created at step S311.

That is, at step S311, the overall properties of a motion script that an expert desires to create are configured, whereby property information may be created.

Here, at step S311, motion script header information that includes at least one of a file property for a motion script and tag information to be used to search for the motion script may be created.

Here, at step S311, the properties of a motion script file, such as an author, the time at which the file was written, the type of sensor, a description of the motion, the category in which the motion is included, and the like, may be described.

Also, at step S311, property information may be assigned to expert motion.

Here, at step S311, information about the properties of a motion itself may be assigned.

Here, at step S311, information about points to be focused on when a learner learns a specific motion, for example, a key pose, a key motion, the importance of a key body part, and the like, may be explicitly specified before an expert captures a motion.

The property information may include at least one of key pose setting information corresponding to key poses, which are important poses in the motion of an expert, key motion setting information corresponding to a key motion, which is an important motion in the motion of an expert, motion setting information about the speed and intensity of the key motion, and body part importance setting information about key body parts of a user, which is the importance of each body part of an expert when each key pose or key motion is performed.

Also, at step S311, whether to provide additional information to help a learner learn a motion may be determined.

Here, at step S311, it may be determined whether to provide additional information for helping learning, for example, an audio sequence such as background music, a voice description of an expert, and the like.

Also, at step S310, expert motion-sensing data may be collected at step S312.

That is, at step S312, expert motion-sensing data may be acquired from the motion of an expert using a motion capture device for authoring.

The motion capture device for authoring may include at least one of a camera, a smartphone, a motion sensor, a position sensor, an acceleration sensor, an inertia sensor, a multi-sensor, and a Kinect device, through which the expert motion-sensing data can be acquired.

Also, at step S310, a motion script may be created at step S313.

That is, at step S313, a motion script may be created based on the configured property information and the acquired sensing data.

Here, at step S313, a motion script may be created from a sensing data sequence corresponding to the expert performance, acquired using the motion capture device for authoring (an inexpensive 3D camera, a smartphone, variable sensors, or the like), and from the header and property information of the motion script, which is set and assigned in the authoring unit 110.

Here, at step S313, the type and characteristics of a motion capture device are detected, and motion descriptor information may be created from the acquired expert motion-sensing data based on the detected type and characteristics of the motion capture device.

Here, at step S313, exemplary motions may be described by receiving the expert motion-sensing data, acquired by capturing the performance of an expert.

Here, at step S313, the type and characteristics of the motion capture device for authoring, which is connected with the current system, are detected, and expert motion-sensing data extractable from the device may be acquired.

For example, when a 3D camera, such as a Kinect, is connected with the current system, a depth image sequence, a 2D image sequence, or an audio sequence may be input, and expert motion-sensing data corresponding thereto may be stored as a component of a motion descriptor.

Here, at step S313, an additional component of the motion descriptor may be created by extracting the position of a body part from the depth image sequence.

Also, at step S313, motion property information may be created from the acquired expert motion-sensing data based on property information.

Here, at step S313, the motion properties assigned by an expert in the authoring unit 110 are stored, and at the same time, properties may be automatically extracted from the motion of the expert.

For example, at step S313, the displacement, the speed, the acceleration, the angular speed, and the like of the motion in the whole body, the upper body, the lower body, both arms, and both legs may be extracted.

Here, at step S313, motion property information, such as the size, the speed, the complexity, the intensity, and the flexibility of the full motion or a motion unit of the corresponding motion, may be created based on the extracted quantified information.

The motion property information is characteristics related to the dynamic quality of a continuous motion, which differs from a static posture such as a pose, and may become a criterion for the provision of corrective information for a method for expressing motions with high precision when self-teaching is performed.

Here, at step S313, a motion script that includes at least one of the motion script header information, the motion property information, the motion descriptor information, and the additional information may be created.

Also, in the method for self-teaching of a motion according to an embodiment of the present invention, a motion script may be published at step S320.

That is, at step S320, the motion script-writing apparatus 100 may distribute the motion script in a motion script store server 10.

Here, at step S320, functions, such as editing images of a motion script, correcting motions and properties in detail, editing additional information, and publishing a store site, may be performed through a UI.

Here, at step S320, the final motion script, acquired in such a way that the created motion script is edited by performing at least one of editing images, correcting motion details, correcting property details, and editing additional information, may be distributed in the motion script store server.

Also, in the method for self-teaching of a motion according to an embodiment of the present invention, self-teaching of a motion script may be performed at step S330.

At step S330, first, a motion script may be set at step S331.

That is, at step S331, the motion script, downloaded from a motion script store server 10 depending on the motion that a learner wants to learn, may be set.

Here, at step S331, a motion script, acquired by a learner, may be directly input, or a motion script may be downloaded from the motion script store server 10.

Here, at step S331, learning property information may be configured by selecting properties necessary for the motion that the learner wants to learn from the motion property information included in the motion script.

Here, at step S331, learning environment information for the motion that the learner wants to learn may be set.

Here, at step S331, the header and properties of a learner's motion script may be configured in order to create the learner's motion script from the motion of the learner.

Also, at step S330, learner's motion-sensing data may be acquired at step S332.

That is, at step S332, learner's motion-sensing data may be acquired from the motion of the learner using a motion capture device for learning.

The motion capture device for learning may include at least one of a camera, a smartphone, a motion sensor, a position sensor, an acceleration sensor, an inertia sensor, a multi-sensor, and a Kinect device, through which the learner's motion-sensing data may be acquired from the motion of the learner.

Also, at step S330, the motion of the learner may be evaluated at step S333.

At step S333, first, a comparison of motion descriptors and a comparison of motion properties may be performed at step S333A.

That is, at step S333A, the performance of a learner, acquired using the motion capture device for learning (an inexpensive 3D camera, a smartphone, or various sensors) is compared with the motion described in the motion script of an expert, and analyzed, whereby suitable evaluation information may be provided to a user.

Here, at step S333A, the motion descriptor and the motion properties of an expert in the motion script are compared with the motion descriptor and the motion properties acquired from a motion sequence of the current learner, the result of the comparison is analyzed, and the result of the evaluation may be provided. When the comparison of motions is performed, the motion descriptors and properties extracted from sensing data acquired from the same device are compared, whereby a result may be calculated. Sensing data acquired from different devices may be compared with each other, but the evaluation result may have low reliability because a motion descriptor and motion properties from one device differ from those from another device.

Here, at step S333A, motion descriptor information and motion property information, created from learner's motion-sensing data acquired using the motion capture device for learning, which is the same type of device as the motion capture device for authoring that was used to create the motion script, may be compared.

Also, at step S333, posture accuracy and dynamic expressiveness may be calculated at step S333B.

That is, at step S333B, posture accuracy information and dynamic expressiveness information of the learner may be created based on the motion script and the learner's motion-sensing data.

Here, at step S333B, the expert motion in a motion script may be compared with the motion of the learner who is emulating the expert motion, and the result of the comparison may be analyzed.

Here, at step S333B, a value related to the accuracy of a posture may be calculated through the comparison of motion descriptors, and a result of analysis of dynamic expressiveness may be calculated through the comparison of motion properties.

Here, at step S333B, motion descriptor information and motion property information, created from learner's motion-sensing data acquired using the motion capture device for learning, which is the same type of device as the motion capture device for authoring that was used to create the motion script, may be compared and analyzed.

Here, at step S333B, posture accuracy information including posture accuracy values may be created, each of the posture accuracy values being acquired by analyzing the similarity between the posture of the learner and the posture in the motion script for each result of analysis performed on the motion descriptor information and the motion property information of the motion script and the acquired learner's motion-sensing data.

Here, at step S333B, the final motion evaluation information may be created based on the posture accuracy information and the dynamic expressiveness information.

Here, at step S333B, a weight for each of the posture accuracy values and each of the dynamic expressiveness values may be set based on at least one of the number, the type and the characteristics of motion capture devices for learning.

Here, at step S333B, component proportions for the posture accuracy values and the dynamic expressiveness values may be set for each motion of the learner, wherein the component proportions are to be applied when the posture accuracy values and the dynamic expressiveness values, the weights of which are set, are added.

Also, at step S333, the final motion evaluation information may be created at step S333C.

That is, at step S333C, the final motion evaluation information, including the final motion evaluation values calculated by adding the posture accuracy values and the dynamic expressiveness values based on the component proportions set for each motion of the learner, may be created.

Here, at step S333C, in proportion to the learning capability value of the learner, a component proportion of the dynamic expressiveness values may be set higher and a component proportion of the posture accuracy values may be set lower.

For example, at step S333C, if the learning capability value of the learner is set low so as to correspond to a beginner, a component proportion of the posture accuracy values may be set high, but a component proportion of the dynamic expressiveness values may be set low.

Here, at step S333C, if the learning capability value of the learner is set high so as to correspond to an expert, a component proportion of the dynamic expressiveness values may be set high, but a component proportion of the posture accuracy values may be set low.

Also, in the method for self-teaching of a motion according to an embodiment of the present invention, the final motion evaluation result may be output at step S340.

That is, at step S340, the final motion evaluation information and motion-corrective information for correcting the motion of the learner may be output.

Here, at step S340, motions may be corrected in real time by receiving the final evaluation result information, and the comprehensive evaluation result of the learner and the evaluation of details may be provided.

Here, at step S340, a learner may receive help in continuously correcting the motion based on the learning result through learning history management.

Here, at step S340, based on the final motion evaluation information, a score of each evaluation element and learning evaluation information including the motion accuracy in each body part of the learner may be further output.

Here, at step S340, in-depth evaluation information including variation of a score of each evaluation element of the expert motion learned by the user may be further output.

Here, at step S340, the learner's motion script may be edited using a UI, through which the motion script of the learner can be published, based on the final evaluation result information and the corrective information, and the edited learner's motion script may be distributed in the motion script store server.

Figure 11:
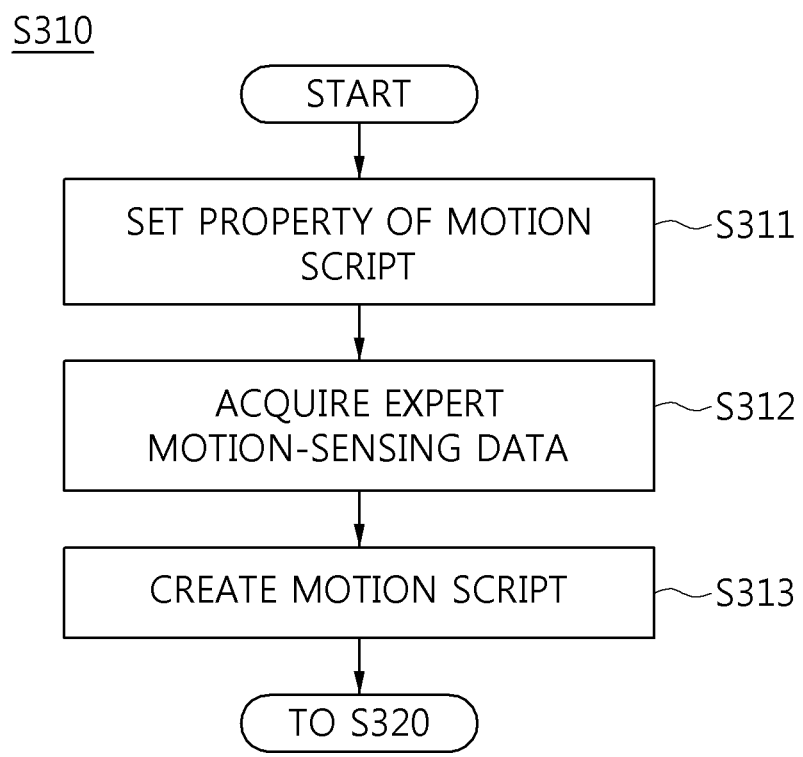
FIG. 11 is a flowchart that specifically shows an example of the step of writing a motion script, illustrated in FIG. 10.

FIG. 11 is a flowchart that specifically shows an example of the step of writing a motion script, illustrated in FIG. 10.

Referring to FIG. 11, at step S311, the overall properties of a motion script that an expert desires to create are configured, whereby property information may be created.

Here, at step S311, motion script header information that includes at least one of a file property for a motion script and tag information to be used to search for the motion script may be created.

Here, at step S311, the properties of a motion script file, such as an author, the time at which the file was written, the type of sensor, a description of the motion, the category in which the motion is included, and the like, may be described.

Also, at step S311, property information may be assigned to expert motion.

Here, at step S311, information about the properties of the motion itself may be assigned.

Here, at step S311, information about points to be focused on when a learner learns a specific motion, for example, a key pose, a key motion, the importance of a key body part, and the like, may be explicitly specified before an expert captures a motion.

The property information may include at least one of key pose setting information corresponding to key poses, which are important poses in the motion of an expert, key motion setting information corresponding to a key motion, which is an important motion in the motion of an expert, motion setting information about the speed and intensity of the key motion, and body part importance setting information about key body parts of a user, which is the importance of each body part of an expert when each key pose or key motion is performed.

Also, at step S311, whether to provide additional information to help a learner learn a motion may be determined.

Here, at step S311, it may be determined whether to provide additional information for helping learning, for example, an audio sequence such as background music, a voice description of an expert, and the like.

Also, at step S310, expert motion-sensing data may be collected at step S312.

That is, at step S312, expert motion-sensing data may be acquired from the motion of an expert using a motion capture device for authoring.

The motion capture device for authoring may include at least one of a camera, a smartphone, a motion sensor, a position sensor, an acceleration sensor, an inertia sensor, a multi-sensor, and a Kinect device, through which the expert motion-sensing data can be acquired.

Also, at step S310, a motion script may be created at step S313.

That is, at step S313, a motion script may be created based on the configured property information and the acquired sensing data.

Here, at step S313, a motion script may be created from a sensing data sequence corresponding to the expert performance, acquired using the motion capture device for authoring (an inexpensive 3D camera, a smartphone, variable sensors, or the like), and from the header and property information of the motion script, which is set and assigned in the authoring unit 110.

Here, at step S313, the type and characteristics of a motion capture device are detected, and motion descriptor information may be created from the acquired expert motion-sensing data based on the detected type and characteristics of the motion capture device.

Here, at step S313, exemplary motions may be described by receiving the expert motion-sensing data, acquired by capturing the performance of an expert.

Here, at step S313, the type and characteristics of the motion capture device for authoring, which is connected with the current system, are detected, and expert motion-sensing data extractable from the device may be acquired.

For example, when a 3D camera, such as a Kinect, is connected with the current system, a depth image sequence, a 2D image sequence, or an audio sequence may be input, and expert motion-sensing data corresponding thereto may be stored as a component of a motion descriptor.

Here, at step S313, an additional component of the motion descriptor may be created by extracting the position of a body part from the depth image sequence.

Also, at step S313, motion property information may be created from the acquired expert motion-sensing data based on property information.

Here, at step S313, the motion properties assigned by an expert in the authoring unit 110 are stored, and at the same time, properties may be automatically extracted from the motion of the expert.

For example, at step S313, the displacement, the speed, the acceleration, the angular speed, and the like of the motion in the whole body, the upper body, the lower body, both arms, and both legs may be extracted.

Here, at step S313, motion property information, such as the size, the speed, the complexity, the intensity, and the flexibility of the full motion or a motion unit of the corresponding motion, may be created based on the extracted quantified information.

The motion property information is characteristics related to the dynamic quality of a continuous motion, which differs from a static posture such as a pose, and may become a criterion for the provision of corrective information for a method for expressing motions with high precision when self-teaching is performed.

Here, at step S313, a motion script that includes at least one of the motion script header information, the motion property information, the motion descriptor information, and the additional information may be created.

Figure 12:
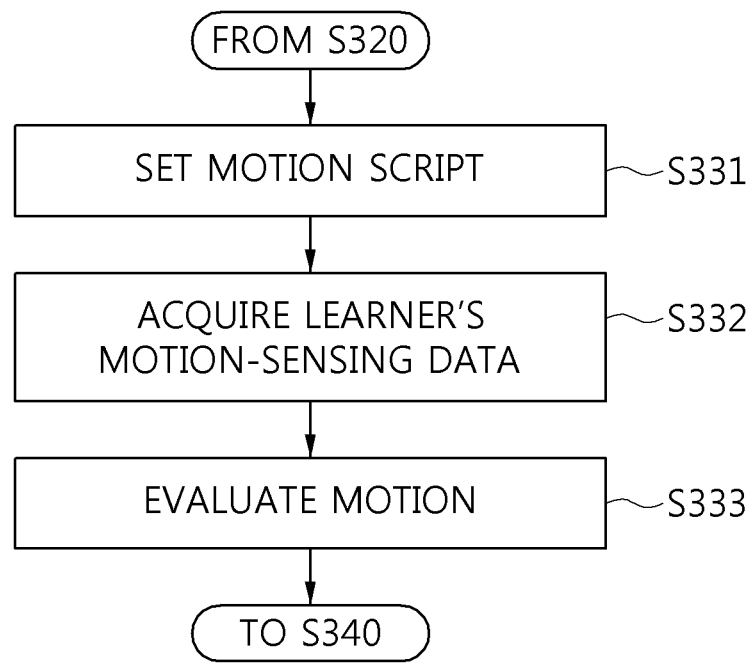
FIG. 12 is a view that specifically shows an example of the step of teaching oneself a motion, illustrated in FIG. 10.

FIG. 12 is a flowchart that specifically shows an example of the step of teaching oneself a motion, illustrated in FIG. 10.

Referring to FIG. 12, at step S331, the motion script, downloaded from a motion script store server 10 depending on the motion that a learner wants to learn, may be set.

Here, at step S331, a motion script, acquired by a learner, may be directly input, or a motion script may be downloaded from the motion script store server 10.

Here, at step S331, learning property information may be configured by selecting properties necessary for the motion that the learner wants to learn from the motion property information included in the motion script.

Here, at step S331, learning environment information for the motion that the learner wants to learn may be set.

Here, at step S331, the header and properties of a learner's motion script may be configured in order to create the learner's motion script from the motion of the learner.

Also, at step S330, learner's motion-sensing data may be acquired at step S332.

That is, at step S332, learner's motion-sensing data may be acquired from the motion of the learner using a motion capture device for learning.

The motion capture device for learning may include at least one of a camera, a smartphone, a motion sensor, a position sensor, an acceleration sensor, an inertia sensor, a multi-sensor, and a Kinect device, through which the learner's motion-sensing data may be acquired from the motion of the learner.

Also, at step S330, the motion of the learner may be evaluated at step S333.

At step S333, first, a comparison of motion descriptors and a comparison of motion properties may be performed at step S333A.

That is, at step S333A, the performance of a learner, acquired using the motion capture device for learning (an inexpensive 3D camera, a smartphone, or various sensors) is compared with the motion described in the motion script of an expert, and analyzed, whereby suitable evaluation information may be provided to a user.

Here, at step S333A, the motion descriptor and the motion properties of an expert in the motion script are compared with the motion descriptor and the motion properties acquired from a motion sequence of the current learner, the result of the comparison is analyzed, and the result of the evaluation may be provided. When the comparison of motions is performed, the motion descriptors and properties extracted from sensing data acquired from the same device are compared, whereby a result may be calculated. Sensing data acquired from different devices may be compared with each other, but the evaluation result may have low reliability because a motion descriptor and motion properties from one device differ from those from another device.

Here, at step S333A, motion descriptor information and motion property information, created from learner's motion-sensing data acquired using the motion capture device for learning, which is the same type of device as the motion capture device for authoring that was used to create the motion script, may be compared.

Also, at step S333, posture accuracy and dynamic expressiveness may be calculated at step S333B.

That is, at step S333B, posture accuracy information and dynamic expressiveness information of the learner may be created based on the motion script and the learner's motion-sensing data.

Here, at step S333B, the expert motion in a motion script may be compared with the motion of the learner who is emulating the expert motion, and the result of the comparison may be analyzed.

Here, at step S333B, a value related to the accuracy of a posture may be calculated through the comparison of motion descriptors, and a result of analysis of dynamic expressiveness may be calculated through the comparison of motion properties.

Here, at step S333B, motion descriptor information and motion property information, created from learner's motion-sensing data acquired using the motion capture device for learning, which is the same type of device as the motion capture device for authoring that was used to create the motion script, may be compared and analyzed.

Here, at step S333B, posture accuracy information including posture accuracy values may be created, each of the posture accuracy values being acquired by analyzing the similarity between the posture of the learner and the posture in the motion script for each result of analysis performed on the motion descriptor information and the motion property information of the motion script and the acquired learner's motion-sensing data.

Here, at step S333B, the final motion evaluation information may be created based on the posture accuracy information and the dynamic expressiveness information.

Here, at step S333B, a weight for each of the posture accuracy values and each of the dynamic expressiveness values may be set based on at least one of the number, the type and the characteristics of motion capture devices for learning.

Here, at step S333B, component proportions for the posture accuracy values and the dynamic expressiveness values may be set for each motion of the learner, wherein the component proportions are to be applied when the posture accuracy values and the dynamic expressiveness values, the weights of which are set, are added.

Also, at step S333, the final motion evaluation information may be created at step S333C.

That is, at step S333C, the final motion evaluation information, including the final motion evaluation values calculated by adding the posture accuracy values and the dynamic expressiveness values based on the component proportions set for each motion of the learner, may be created.

Here, at step S333C, in proportion to the learning capability value of the learner, a component proportion of the dynamic expressiveness values may be set higher and a component proportion of the posture accuracy values may be set lower.

For example, at step S333C, if the learning capability value of the learner is set low so as to correspond to a beginner, a component proportion of the posture accuracy values may be set high, but a component proportion of the dynamic expressiveness values may be set low.

Here, at step S333C, if the learning capability value of the learner is set high so as to correspond to an expert, a component proportion of the dynamic expressiveness values may be set high, but a component proportion of the posture accuracy values may be set low.

Figure 13:
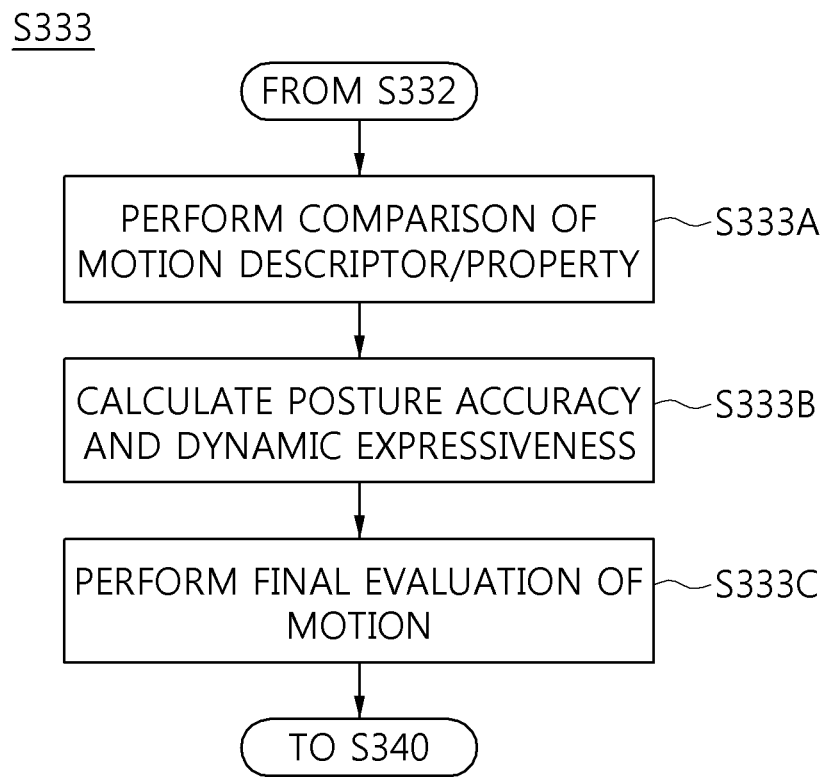
FIG. 13 is a flowchart that specifically shows an example of the step of evaluating a motion, illustrated in FIG. 12.

FIG. 13 is a flowchart that specifically shows an example of the step of evaluating a motion, illustrated in FIG. 12.

Referring to FIG. 13, at step S333A, the performance of a learner, acquired using the motion capture device for learning (an inexpensive 3D camera, a smartphone, or various sensors) is compared with the motion described in the motion script of an expert, and analyzed, whereby suitable evaluation information may be provided to a user.

Here, at step S333A, the motion descriptor and the motion properties of an expert in the motion script are compared with the motion descriptor and the motion properties acquired from a motion sequence of the current learner, the result of the comparison is analyzed, and the result of the evaluation may be provided. When the comparison of motions is performed, the motion descriptors and properties extracted from sensing data acquired from the same device are compared, whereby a result may be calculated. Sensing data acquired from different devices may be compared with each other, but the evaluation result may have low reliability because a motion descriptor and motion properties from one device differ from those from another device.

Here, at step S333A, motion descriptor information and motion property information, created from learner's motion-sensing data acquired using the motion capture device for learning, which is the same type of device as the motion capture device for authoring that was used to create the motion script, may be compared.

Also, at step S333, posture accuracy and dynamic expressiveness may be calculated at step S333B.

That is, at step S333B, posture accuracy information and dynamic expressiveness information of the learner may be created based on the motion script and the learner's motion-sensing data.

Here, at step S333B, the expert motion in a motion script may be compared with the motion of the learner who is emulating the expert motion, and the result of the comparison may be analyzed.

Here, at step S333B, a value related to the accuracy of a posture may be calculated through the comparison of motion descriptors, and a result of analysis of dynamic expressiveness may be calculated through the comparison of motion properties.

Here, at step S333B, motion descriptor information and motion property information, created from learner's motion-sensing data acquired using the motion capture device for learning, which is the same type of device as the motion capture device for authoring that was used to create the motion script, may be compared and analyzed.

Here, at step S333B, posture accuracy information including posture accuracy values may be created, each of the posture accuracy values being acquired by analyzing the similarity between the posture of the learner and the posture in the motion script for each result of analysis performed on the motion descriptor information and the motion property information of the motion script and the acquired learner's motion-sensing data.

Here, at step S333B, the final motion evaluation information may be created based on the posture accuracy information and the dynamic expressiveness information.

Here, at step S333B, a weight for each of the posture accuracy values and each of the dynamic expressiveness values may be set based on at least one of the number, the type and the characteristics of motion capture devices for learning.

Here, at step S333B, component proportions for the posture accuracy values and the dynamic expressiveness values may be set for each motion of the learner, wherein the component proportions are to be applied when the posture accuracy values and the dynamic expressiveness values, the weights of which are set, are added.

Also, at step S333, the final motion evaluation information may be created at step S333C.

That is, at step S333C, the final motion evaluation information, including the final motion evaluation values calculated by adding the posture accuracy values and the dynamic expressiveness values based on the component proportions set for each motion of the learner, may be created.

Here, at step S333C, in proportion to the learning capability value of the learner, a component proportion of the dynamic expressiveness values may be set higher and a component proportion of the posture accuracy values may be set lower.

For example, at step S333C, if the learning capability value of the learner is set low so as to correspond to a beginner, a component proportion of the posture accuracy values may be set high, but a component proportion of the dynamic expressiveness values may be set low.

Here, at step S333C, if the learning capability value of the learner is set high so as to correspond to an expert, a component proportion of the dynamic expressiveness values may be set high, but a component proportion of the posture accuracy values may be set low.

Figure 14:
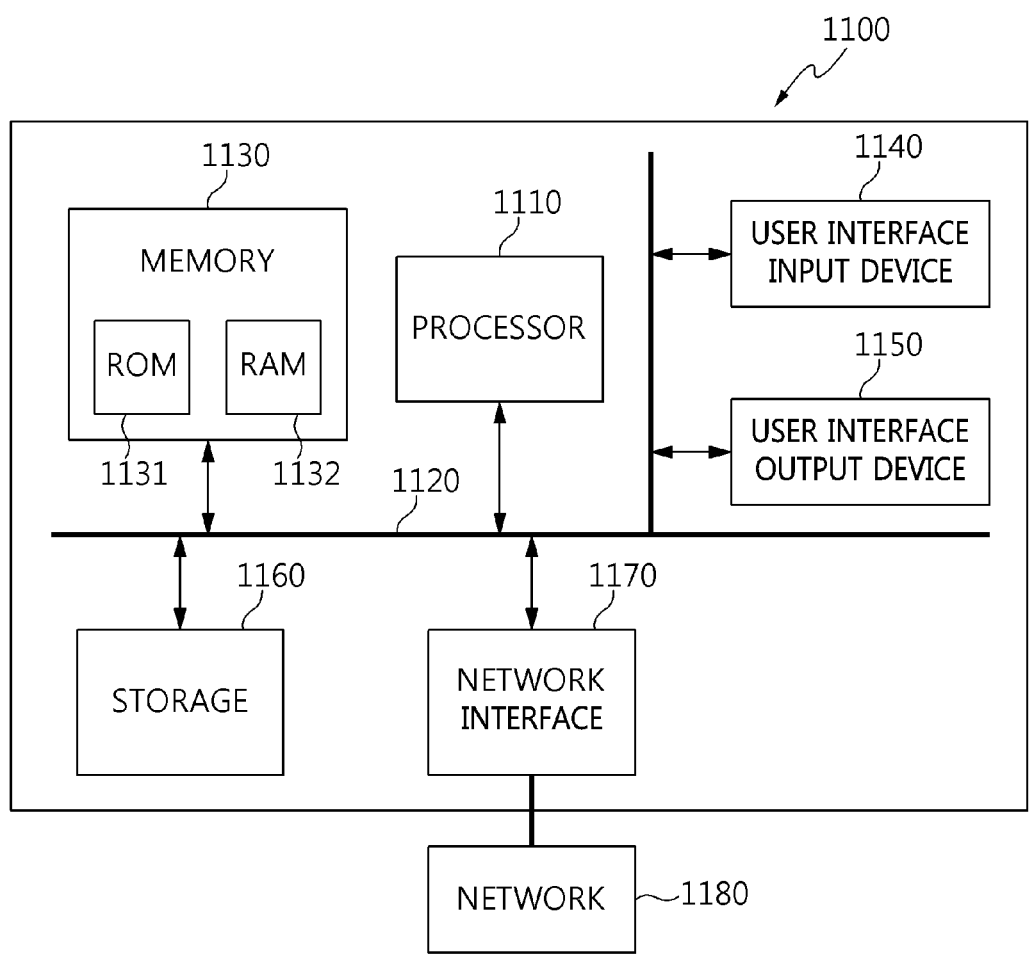
FIG. 14 is a block diagram that shows a computer system according to an embodiment of the present invention.

FIG. 14 is a block diagram that shows a computer system according to an embodiment of the present invention.

Referring to FIG. 14, an embodiment of the present invention may be implemented in a computer system 1100 such as a computer-readable recording medium. As illustrated in FIG. 14, the computer system 1100 may include one or more processors 1110, memory 1130, a user interface input device 1140, a user interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be different forms of volatile or non-volatile storage media. For example, the memory may include ROM 1131 or RAM 1132.

The present invention may provide a universal method for learning exemplary motions in various fields without limitation as to time and place when learners learn motions and postures by themselves.

Also, the present invention may provide a generalized system framework in which an expert in a specific field may write, edit, and publish a motion script based on his or her performance, and in which multiple motion learners may learn correct motions by themselves using the published motion script.

Also, the present invention may enable a motion-based content producer to easily obtain motion data from a high-capacity motion script database, and may thereby support the production of instructional content and a motion-based service in which the expense for producing content is significantly reduced.

Also, the present invention may enable learners to be provided with various motion-based content and services, developed by content producers, from a motion script store server, and may improve satisfaction with content in order to increase demand for self-teaching of a motion.

Also, the present invention may overcome the limitations of an existing self-teaching method, in which learners merely follow an instructional video, and may contribute to the construction of an ecosystem of content service related to self-teaching of motions.

As described above, the apparatus for writing a motion script and the apparatus and method for self-teaching of a motion according to the present invention are not limitedly applied to the configurations and operations of the above-described embodiments, but all or some of the embodiments may be selectively combined and configured, so that the embodiments may be modified in various ways.

What is claimed is:

1. An apparatus for writing a motion script, comprising:
a processor and a non-transitory computer readable storage media storing a plurality of units which are executed by the processor, the plurality of units comprising:
an authoring unit for creating property information corresponding to a motion of a user;
a sensor unit for acquiring sensing data from the motion of the user;
a motion script creation unit for creating a motion script based on the property information and the sensing data; and
an editing and publication unit for distributing the motion script, wherein the authoring unit comprises:
a header information configuration unit for creating motion script header information including at least one of a file property for the motion script and tag information to be used to search for the motion script;
a motion property-mapping unit for mapping the motion of the user to the property information; and
an additional information configuration unit for determining whether to provide additional information used for motion learning.

2. The apparatus of claim 1, wherein the property information includes at least one of:
key pose setting information corresponding to a key pose of the user;
key motion setting information corresponding to a key motion of the user;

motion setting information corresponding to a speed and an intensity of the key motion; and key body part setting information corresponding to a key body part of the user based on the key pose and the key motion.

3. The apparatus of claim 2, wherein the motion script creation unit comprises:
a motion descriptor creation unit for detecting a type and characteristics of a motion capture device and creating motion descriptor information from the acquired sensing data based on the detected type and characteristics of the motion capture device; and
a motion property creation unit for creating motion property information from the acquired sensing data based on the property information.

4. The apparatus of claim 3, wherein the motion script creation unit creates the motion script including at least one of the motion script header information, the motion property information, the motion descriptor information, and the additional information.

5. The apparatus of claim 4, wherein the editing and publication unit distributes a final motion script, acquired in such a way that the created motion script is edited by performing at least one of editing of images, correction of motion details, correction of property details, and editing of additional information, in a motion script store server.

* * * * *